(12) United States Patent
Wygnanski et al.

(10) Patent No.: US 9,610,929 B2
(45) Date of Patent: Apr. 4, 2017

(54) AIR BRAKING SYSTEM

(75) Inventors: Wladyslaw Wygnanski, Cambridge (GB); David Cebon, Cambridge (GB); Frank Kienhofer, Mondeor (ZA); Robert Prescott, Solihull (GB)

(73) Assignees: Haldex Brake Products Ltd. (GB); Camcon Technology Ltd. (GB); Cambridge Enterprise Limited (GB)

( * ) Notice: Subject to any disclaimer, the term of this patent is extended or adjusted under 35 U.S.C. 154(b) by 2284 days.

(21) Appl. No.: 12/376,918

(22) PCT Filed: Aug. 9, 2007

(86) PCT No.: PCT/GB2007/003034
§ 371 (c)(1),
(2), (4) Date: Jul. 7, 2010

(87) PCT Pub. No.: WO2008/017850
PCT Pub. Date: Feb. 14, 2008

(65) Prior Publication Data
US 2010/0327653 A1    Dec. 30, 2010

(30) Foreign Application Priority Data
Aug. 9, 2006   (GB) .................... 0615837.2

(51) Int. Cl.
*B60T 13/16*   (2006.01)
*B60T 8/36*    (2006.01)
*B60T 8/34*    (2006.01)

(52) U.S. Cl.
CPC ............ *B60T 8/3675* (2013.01); *B60T 8/343* (2013.01)

(58) Field of Classification Search
USPC .......................... 303/3, 7, 123, 127
See application file for complete search history.

(56) References Cited

U.S. PATENT DOCUMENTS

| | | | |
|---|---|---|---|
| 3,724,914 A | | 4/1973 | Skoyles |
| 3,740,104 A | * | 6/1973 | Wolf .......................... 303/116.3 |
| 3,980,350 A | * | 9/1976 | Oberg ........................... 303/185 |
| 4,693,521 A | | 9/1987 | Takata et al. |
| 4,740,041 A | | 4/1988 | Pannbacker |
| 4,768,840 A | | 9/1988 | Sullivan et al. |
| 5,100,208 A | * | 3/1992 | Angermair ...................... 303/36 |
| 5,118,169 A | * | 6/1992 | Moller ......................... 303/118.1 |
| 5,255,962 A | | 10/1993 | Neuhaus et al. |
| 5,288,139 A | | 2/1994 | Singleton et al. |

(Continued)

FOREIGN PATENT DOCUMENTS

EP        0584829 A2     3/1994

*Primary Examiner* — Robert A Siconolfi
*Assistant Examiner* — Mahbubur Rashid
(74) *Attorney, Agent, or Firm* — Lowe Graham Jones PLLC

(57) ABSTRACT

An air braking unit for use in an air braking system. The air braking unit is arranged to be positioned, in use, at a vehicle wheel, and comprises an inlet for receiving, in use, compressed air from a central source. At least one first valve is arranged to selectively allow compressed air from the inlet to enter a wheel brake chamber in use. At least one second valve is arranged to selectively allow air from the brake chamber to be released via an outlet to the atmosphere in use and control means controls the first and second valves to operate to selectively control the air pressure in the brake chamber in use.

9 Claims, 5 Drawing Sheets

(56) References Cited

U.S. PATENT DOCUMENTS

| | | | |
|---|---|---|---|
| 5,722,740 A * | 3/1998 | Engelbert et al. | 303/118.1 |
| 6,050,653 A * | 4/2000 | Wachi et al. | 303/113.4 |
| 6,079,790 A * | 6/2000 | Broome | 303/3 |
| 6,247,764 B1 * | 6/2001 | Koelzer | 303/118.1 |
| 7,717,130 B2 * | 5/2010 | Batdorff et al. | 137/625.33 |
| 2001/0033105 A1 * | 10/2001 | Frank et al. | 303/20 |
| 2006/0096636 A1 * | 5/2006 | Ho et al. | 137/102 |

\* cited by examiner

AIR BRAKING SYSTEM

PRIORITY CLAIM

This application claims priority to International Application PCT/GB2007/003034, filed Aug. 9, 2007 which claims priority to Great Britain Application 0615837.2, filed Aug. 9, 2006 and are incorporated herein by reference.

The present invention relates to an air braking system for a vehicle, together with an air braking unit for use in such a system.

Air braking systems with vehicles, together with units for use in such vehicles, are well known and have been in use for many years. Air braking systems have a large number of applications in a wide range of vehicles, such as trains, fixed wheel base trucks and articulated lorries. Such systems have become popular through their ease of design and installation, flexibility in use, and high degree of reliability in what is considered to be an extremely safety-critical aspect of a vehicle. However, such systems do have problems associated with them, particularly in situations where adverse braking conditions occur and extreme braking requirements are needed. For example, such systems can have a tendency to lock under extreme braking and can have considerable difficulty in adapting to different braking environments, such as when the vehicle is passing over a low-friction surface of the type created by water or ice, particularly if all wheels of a vehicle employing the braking system are not passing over the same type of surface at the same time.

In recent years, in order to overcome some of these problems, anti-lock air braking systems have been developed. Such systems can be quite complex, but in general terms operate by detecting the onset of a locking condition brake to which air is being applied, releasing air pressure being applied to that brake to remove the "lock" and then reapplying air pressure to re-introduce braking. Whilst clearly improving air braking systems, such anti-lock systems still have considerable problems associated with them. Firstly, they are not particularly responsive, given that the removal and reapplication of air pressure takes some time to occur. Secondly, they are also inefficient and require bulky and power consuming pressurised air generation components in order to produce the required volumes of pressured air, much of which is simply lost during the anti-locking process.

The present invention seeks to provide an air braking system for vehicles which has anti-locking capability which overcomes many of the problems associated with prior art arrangements.

According to the present invention there is provided an air braking unit for use in an air braking system, the air braking unit being arranged to be positioned, in use, at a vehicle wheel, and comprising:
an inlet for receiving, in use, compressed air from a central source;
at least one first valve arranged to selectively allow compressed air to enter a wheel brake chamber in use;
at least one second valve arranged to selectively allow air from the brake chamber to be released to the atmosphere in use; and
means for controlling the first and second valves to operate to selectively control the air pressure in the brake chamber in use.

The air braking unit may comprise plural first valves and/or plural second valves. In each case the plural valves may comprise one or more larger valves arranged to allow large volumes of air to pass therethrough and one or more smaller valves arranged to allow passage of smaller volumes of air therethrough. The smaller valves are preferably arranged to have a rapid response time and may use binary actuation technology. Example valves are shown in GB-A-2377555 or GB-A-2390414, GB-A-2380064, GB-A-2394028 and GB-A-2379726.

The control means may be arranged to receive control signals from a wheel speed sensor and an air pressure sensor for determining the pressure in the brake chamber. The control means may further be arranged to receive vehicle speed data as well as reference data indicative of an optimum braking force for given vehicle and wheel speeds.

The present invention further comprises an air braking system comprising one or more of the units defined above;
a pump for generating compressed air; and
a central compressed air storage tank.

By providing a unit which allows a supply of compressed air to be controllably provided at a wheel to be braked, whilst also allowing for rapid fine adjustment of the air pressure to be supplied to a braking chamber, the present invention provides a system which is far more responsive in terms of avoiding brake lock and which is also capable of reducing significantly the amount of compressed air that is wasted during the anti-lock braking process of prior art systems.

One example of the present invention will now be described to the accompanying drawings in which.

Figure 1:
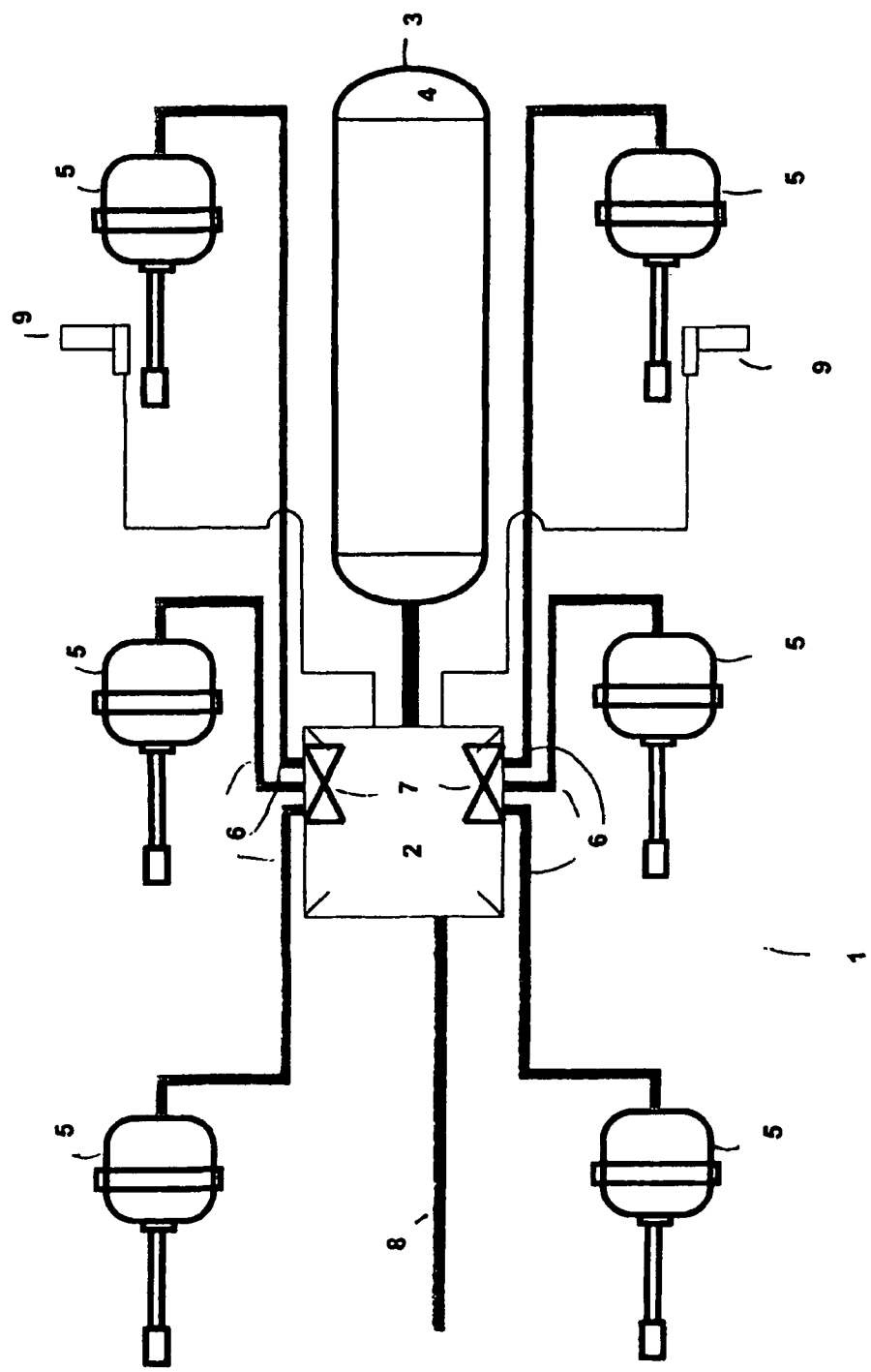
FIG. 1 is a schematic diagram of a prior art air braking system.

Referring to FIG. 1, a standard prior art braking system 1 for use in a multi wheeled vehicle is shown. In this example, the system is for a truck trailer but could be applied to other types of vehicle. The air braking system 1 has a central control unit 2, a source of compressed air 3 and a storage tank 4 for storing compressed air. Each wheel of the vehicle (not shown) is provided with a braking chambers. In use, the braking chambers 5 receive compressed air to activate their respective brake and brake their respective wheel. Air is received at each braking chamber 5 via an associated air line 6 which is connected to the control unit. The control unit 2 receives pressurised air from the tank. The air lines 6 are connected to one or more valves 7, each valve 7 being connected to the air line 6 at the control unit 2.

One or more wheel speeds are measured by wheel speed sensors 9 and signals from these sensors 9 are transmitted to the control unit 2.

In use, a braking signal is received by the control unit 2 from input 8 to activate the control unit 2. The control unit 2 then controls the respective valves 7 in accordance with requested braking and the wheel speed signals from sensors 9 so that compressed air is provided to the respective brake chamber 5 via the respective air line 6.

Figure 4:
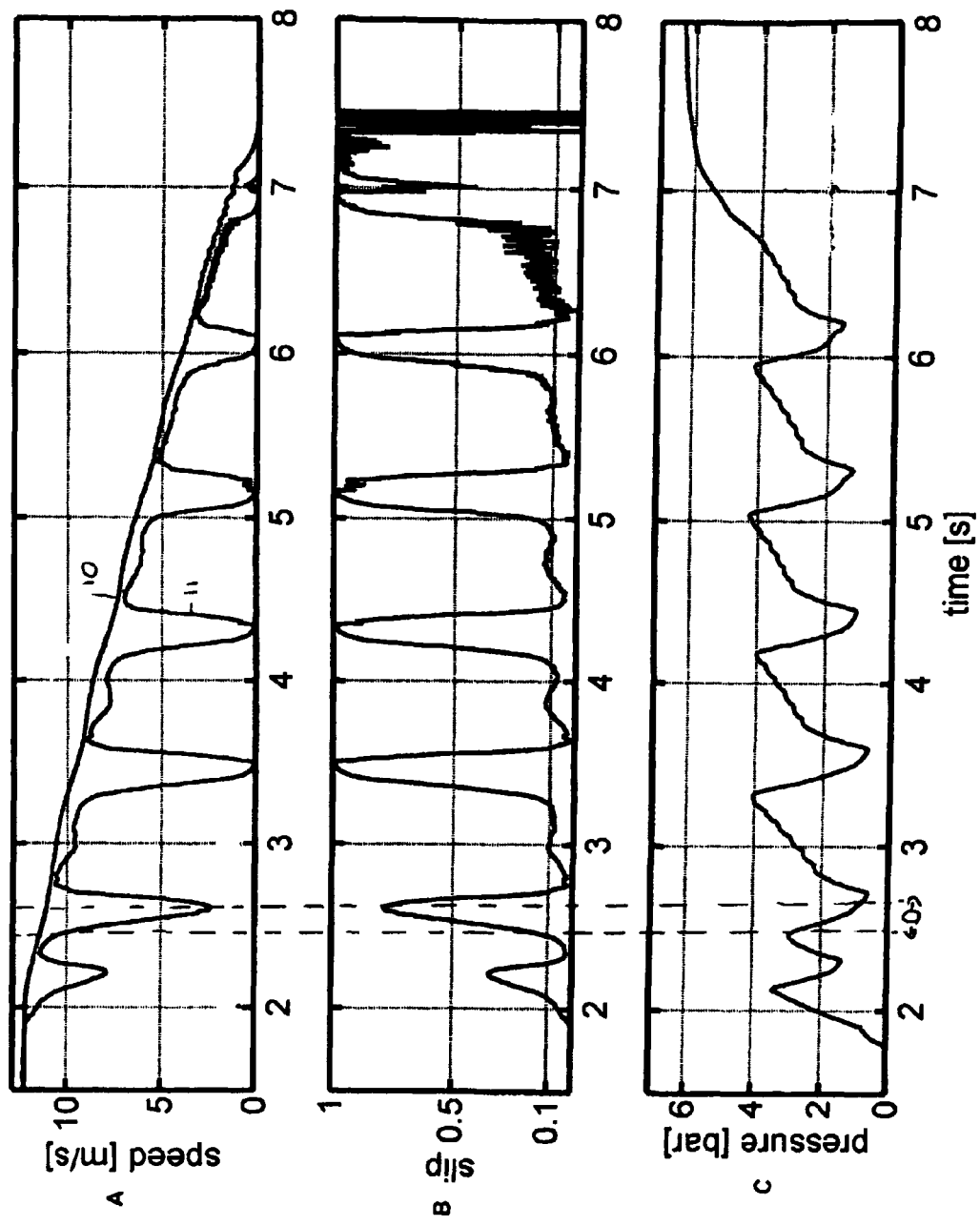
FIG. 4 is a graph showing a traditional anti-lock braking operation.

Anti-lock operation of the system of FIG. 1 will now be described with partial reference to the graph of FIG. 4. The graph of FIG. 4A shows speed versus time during a braking operation for a vehicle. Line 10 shows vehicle speed. Line 11 shows actuals speed for a given wheel of the vehicle under braking. From the graph of FIG. 4A it can be seen that a wheel under braking control of the prior art system of FIG.

1 has a speed which reduces rapidly and may reach zero at which point it locks as the vehicle speed is still high. The control unit 2 detects the rapid wheel speed reduction by use of a wheel speed sensor output 9 associated with the respective wheel and controls the respective valve 7 to cut pressurised air supply to the respective braking chamber 5 of that wheel. FIG. 4B shows slippage on a wheel under the braking shown in FIG. 4A, from which it can be seen that there is significant slippage during locking. FIG. 4C shows the air pressure in the brake chamber 5 during a braking operation. After a significant time delay D (FIG. 4), caused by delays in air pressure dissipating (as shown in FIG. 4C), the wheel unlocks and starts to gather speed once more, providing a much smaller braking force during this phase of line 11. During this phase the movement of the wheel is detected and the control unit 2 opens the respective valve 7 once more to re-apply compressed air to the respective brake chamber 5. However, given that there is a delay in the time to open the control valve 7 and that air pressure needs to be re-generated over the length of the respective air line 6 and the volume of the braking chamber 5, there is a significant delay before braking force is once more applied to the wheel and its starts to slow. Numerous iterations of locking and un-locking of the wheel occur before full vehicle stop is achieved. This prior art system has significant disadvantages in view of the large volumes of compressed air which are lost during the un-locking part of the process. Furthermore, there is a clearly significant delay in terms of re-generating braking force on the wheel in view of the need for re-establishment of air pressure to the brake. This delay limits the ability of the controller 2 to control the pressure in the chamber 5 accurately.

Figure 2:
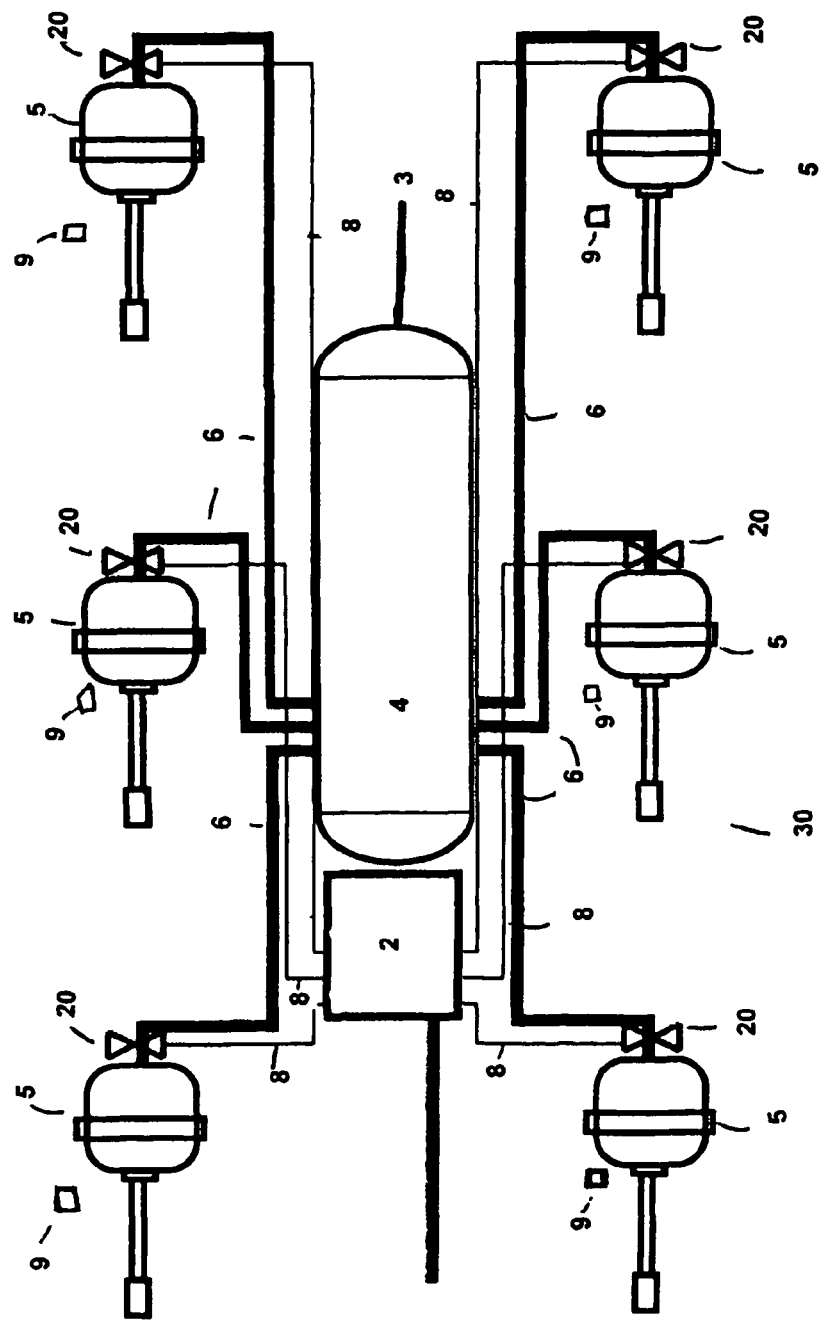
FIG. 2 is a schematic diagram of an air braking system according to the present invention.

FIG. 2 shows a schematic example of a brake unit 20 and braking system 30 according to the present invention. A number of the components of the unit and system of the present invention correspond to those in the prior art, and where this is the case the corresponding reference numerals have been used to avoid repetition.

Figure 3:
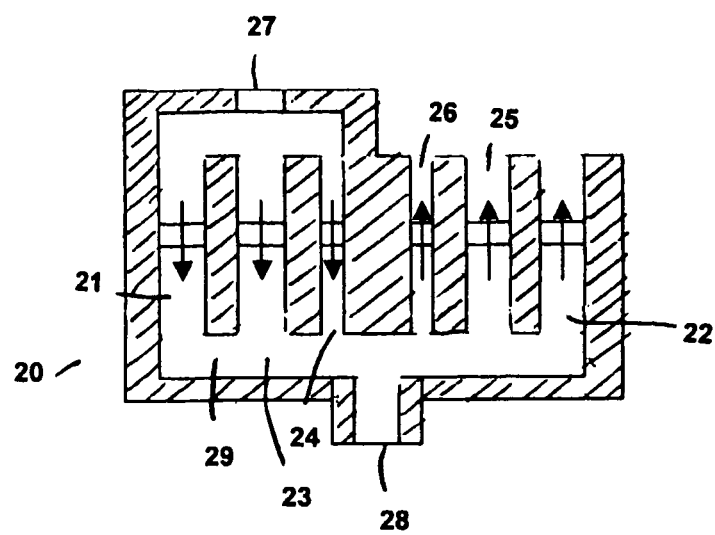
FIG. 3 is a schematic diagram of an air braking unit according to the present invention.

The braking system 30 of the present invention differs from the braking system 1 of the prior art in a number of ways. Firstly, no valves are provided adjacent to the control unit 2 of the system 30 of the present invention. Secondly, each wheel and its associated braking chamber 5 is provided with its own respective brake unit 20 attached thereto. Each brake unit 20 receives compressed air from the tank 4 via air lines 6. A central control unit 2 is provided, although in the present invention there may be additional individual controllers (not shown) associated with braking units 20. A schematic view of an individual braking unit 20 is shown in FIG. 3. As can be seen from FIG. 3, the brake unit 20 has at least one inlet valve 21 and at least one outlet valve 22. In the examples shown there are actually provided three inlet valves 21, 23, 24 and three outlet valves 22, 25 and 26. These components may be contained within a single chamber. All of these valves are connected to a manifold 29. The valves can be mounted directly to the body of the unit, not necessarily in a separate unit. The brake unit 20 has an inlet 27 which is connected, in use, to compressed air line 6. There is also provided an outlet 28 which is attached, in use, to the manifold and to the brake chamber 5 of the individual wheel brake. The outlet valves 22, 25, 26 are connected between the manifold and the atmosphere.

The inlet and outlet valves 21 to 26 are individually controllable and are controlled either via the controller 2 or via the individual controllers associated with each unit 20, not shown but described previously. Indeed it will be appreciated that all the central components may be de-centralised and placed with one or more of the valve units. Much of the operation of the system 30 of the present invention is similar to that of the system 1 of figure one of the prior art. A source of compressed air 3 provides the same to air tank 4, with the possibility that the pump 3 is control unit by the controller 2. However, unlike the system 1 of FIG. 1, the system 30 of the present invention, under normal braking, the controller 2, or the separate controllers associated with each brake unit 20, operate the outlet valves 22, 25 and 26 to close and then open at least one of the inlet valves 21, 23 and 24 to allow compressed air in through the inlet 27 and out through outlet 28 to its respective brake chamber 5. The compressed air applies the brake and the wheel can brake accordingly. The control for the inlet valves 21, 23 and 24 can select which valve (or combination of valves) to open dependent upon the air pressure already present in the brake chamber 5 and the control signal 8 and wheel speed 9. So, if the air pressure is very low compared with the target pressure required by the controller 2 then the largest valve, 21, can be opened to allow a large volume of compressed air into the chamber 5. If, however, air pressure is near to, but lower than the target value, then it may be sufficient only to open one of the smaller valves, 23 or 24, or a combination thereof, to allow in less compressed air. At least some of the smaller valves may be arranged to have a rapid response time such that the speed with which the overall arrangement can respond to control braking air pressure is improved, particularly when compared to a prior art arrangement.

When a brake is to be released then the control operates to open one or more of the outlet valves 22, 25 and 26 to allow a release of air to the atmosphere. Again, dependent upon the air pressure detected in the brake chamber, and perhaps other factors such as the braking force required the control signal 8 and the wheel speed 9, the outlet valves which are selected can be controlled.

The selective control of the valves, together with the presence of the inlet and outlet valves directly adjacent to the brake chamber 5, results in a system which enables very precise control of input air and air outlet to the atmosphere. This means that less compressed air is used during any braking or release operation, resulting in reduced pumping and volume requirements for the air and tank 4, reducing cost and size. It also results in a system which is far more responsive because less time is required to build up the appropriate air pressure in the brake chamber 5 and there is reduced release of compressed air unnecessarily.

The system 30 of the present invention has yet further advantages when an anti-locking braking operation is performed. As with the prior art system 1, each wheel has associated therewith a speed sensor 9 so that its actual speed can be detected. Accordingly, control of the system can detect the speed of an individual wheel. With the system 30 of the present invention, however, the control can also determine, by monitoring air pressure in the brake chamber 5, whether it is necessary to input or release a large or small volume or air in order to control the brake and operate the appropriate inlet valve 21, 23, 24 or outlet valve 22, 25, 26 accordingly. Dependent upon the detected brake pressure, wheel speed or other possible factor that affects the braking, such as actual vehicle speed.

Figure 5:
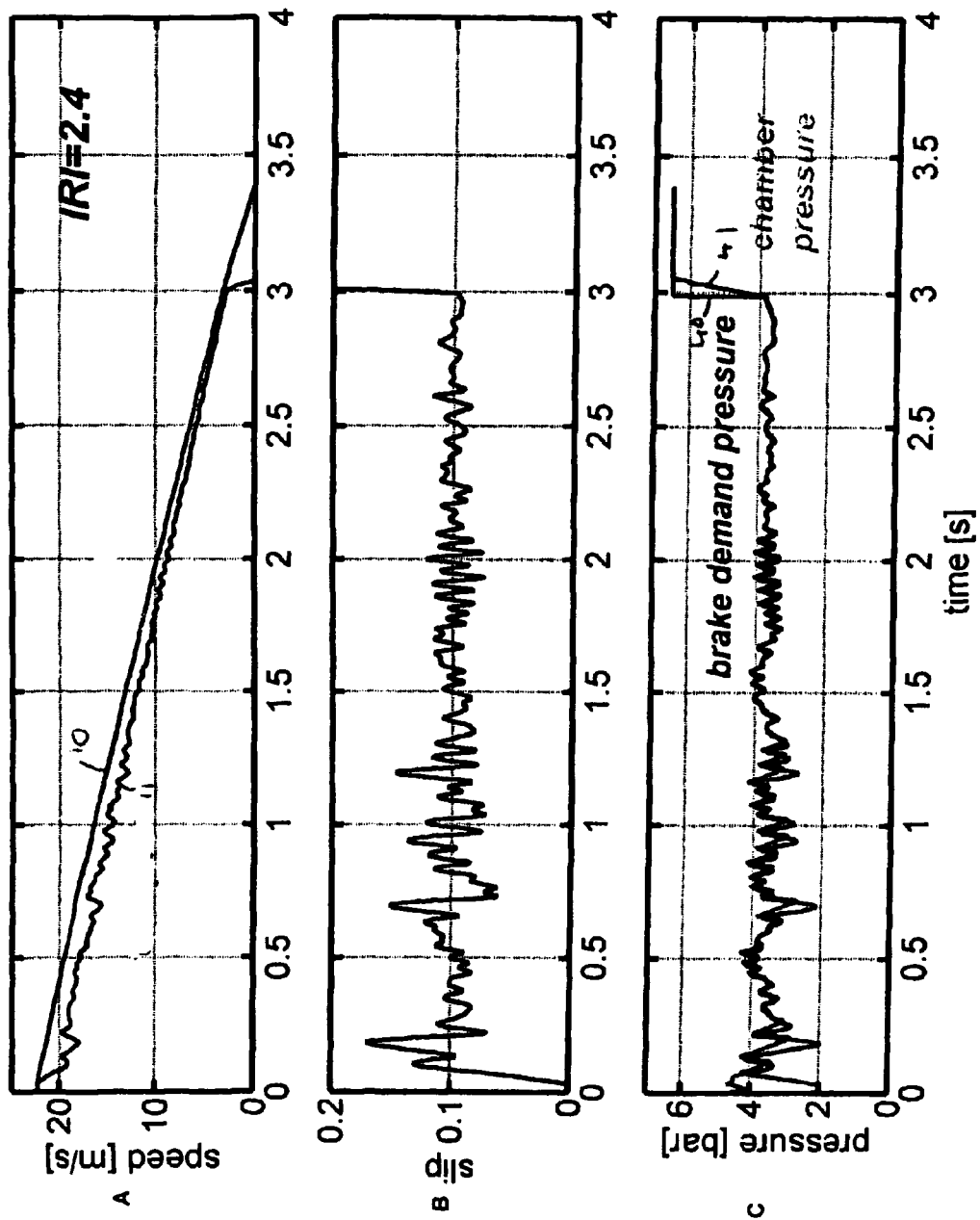
FIG. 5 is a graph showing the characteristics for a vehicle employing the present invention.

Because the braking unit 20 and braking system 30 of the present invention provide a far greater degree of control over the pressure of air applied to the brake chamber 5, the present invention also enables a far greater sophistication in the overall control of the braking system. This can be used to avoid the periodic lock-unlock behaviour during the braking process. As can be seen from FIG. 5A, control of the braking force applied is such that the wheel speed (line 11) is far closer to the vehicle speed (line 10) and that overall stopping time is far less than that of the arrangement of FIG. 1. As shown in FIG. 5B, the amount of slippage of the wheel on the road surface is reduced considerably, and also varies to a far lesser degree than the prior art. As shown in FIG. 5C, the system of the present invention can generate a brake demand pressure (represented by line 40) and can control the pressure in the chamber 5 (represented by line 41) so that it far more closely mirrors the actual pressure demanded in order to achieve optimum braking. Accordingly, with the present invention it is possible to provide a control which can monitor additional factors, such as vehicle speed, braking force, tyre type and temperature, for example, to determine the optimum instantaneous braking force (and hence air pressure to be provided to the braking chamber) for given vehicle speed, road surface conditions, wheel type, vehicle type, etc. One such approach is to have instrumentation on the vehicle that enables the control unit 2 to predict accurately, the optimum value of wheel speed at every instant of time. The control unit 2 can then control the pressure in the chamber 5 so as to achieve continuously that target wheel speed. Such a system may include instrumentation such as accelerometers to measure the longitudinal lateral and vertical acceleration of the vehicle body and rotation-rate-measuring-gyroscopes (or equivalent) which measure the pitch, roll your rotation rates of the vehicle.

The system of the present invention, by employment of these additional controls can therefore provide a braking system which is far more responsive, can handle different locking characteristics on different wheels, which may be dependent upon different wheels engaging with different types of surface (such as ice) at different times, as well as enabling an anti-lock function which can operate at a far higher frequency, reducing braking distance and increasing safety.

The invention claimed is:

1. An air braking unit for use in an air braking system, the air breaking unit comprising:
   an inlet for receiving, in use, compressed air from a central source;
   at least one first valve arranged to selectively allow compressed air from the inlet to enter a wheel brake chamber in use;
   at least one second valve arranged to selectively allow air from the brake chamber to be released via an outlet to the atmosphere in use; and
   control means for controlling the first and second valves to operate to selectively control the air pressure in the brake chamber in use,
   wherein the at least one first valve and at least one second valve are located at a vehicle wheel.

2. The air braking unit of claim 1, further comprising at least a plurality of first valves or plurality of second valves.

3. The air braking unit of claim 2, wherein the plural valves comprise one or more larger valves arranged to allow large volumes of air to pass therethrough and one or more smaller valves arranged to allow passage of smaller volumes of air therethrough.

4. The air braking unit of claim 3, wherein the one or more smaller valves are arranged to operate at high speed.

5. The air braking unit of claim 1, wherein one or more of the valves are driven by binary actuators.

6. The air braking unit of claim 1, wherein the control means is arranged to receive control signals from a wheel speed sensor and an air pressure sensor for determining the pressure in the brake chamber.

7. The air braking unit according to claim 6, wherein the control means is arranged to receive data from a vehicle speed sensor, and reference data indicative of an optimum braking force for given vehicle and wheel speeds and control braking force based thereon.

8. The air braking unit according to claim 6, wherein the control means is arranged to determine, from the sensors, and stored reference data, an optimum speed for each wheel and to control the braking force on each wheel in accordance with the calculated optimum speed.

9. The air braking system of claim 1, further comprising a pump for generating compressed air; and a central compressed air storage tank.

\* \* \* \* \*